United States Patent [19]

Decker, III

[11] 4,271,824

[45] Jun. 9, 1981

[54] SOLAR HEATING APPARATUS

[75] Inventor: Charles R. Decker, III, Warsaw, Ill.

[73] Assignee: Impac Inc., Keokuk, Iowa

[21] Appl. No.: 805,332

[22] Filed: Jun. 10, 1977

[51] Int. Cl.³ .................................................. F24J 3/02
[52] U.S. Cl. .................................... 126/449; 126/429;
126/450; 126/400
[58] Field of Search ............... 126/270, 271, 400, 449,
126/450, 429; 237/1 A

[56] References Cited

U.S. PATENT DOCUMENTS

| 3,301,171 | 1/1967 | Steinberg | 126/270 |
|---|---|---|---|
| 3,875,925 | 4/1975 | Johnston | 126/270 |
| 3,896,786 | 7/1975 | Clevet | 126/270 |
| 4,038,969 | 8/1977 | Smith | 126/271 |
| 4,054,124 | 10/1977 | Knoos | 126/270 |

Primary Examiner—Albert W. Davis
Assistant Examiner—G. Anderson
Attorney, Agent, or Firm—Robert A. Ostmann

[57] ABSTRACT

The disclosure concerns a collector for solar heating apparatus which is adapted for vertical mounting and utilizes air as the heat exchange medium. The collector comprises a glazed insulated box containing a group of energy transfer units, each of which is formed by a pair of similar open top metal foil pans having flat bottom walls which are in abutment and outwardly flaring conical side walls. The pans carry a black energy-absorbing coating and preferably their abutting walls contain registering air flow openings. The energy transfer units are stacked in interfitting relationship in rows and columns, with the axes of adjacent interfitted units in each row and in each column extending in mutually perpendicular directions. The collector may be combined with a fan unit adapted to fit a standard window, thereby providing a portable, economical, auxiliary heater for a room of a building.

9 Claims, 5 Drawing Figures

SOLAR HEATING APPARATUS

BACKGROUND AND SUMMARY OF THE INVENTION

This invention relates to solar heating apparatus, and particularly to the collector and the heat transfer elements employed therein.

The prior art contains many proposals for utilizing insolation for heating buildings, especially homes. All of these systems include a collector which is exposed to incident solar radiation and contains a heat exchange device which transfers absorbed energy to a circulating fluid medium. That medium may be a gas (e.g. air) or a liquid (e.g. water), and the warm circulating stream may be used immediately for heating purposes, or its heat content may be transferred to a storage device and utilized later.

Known collectors are characterized by various disadvantages which have limited the utility of solar heating systems. For example, some sollectors, particularly those which utilize a liquid heat exchange medium, are quite expensive and require considerable maintenance. Others exhibit low efficiency. This is manifested by the large size of the unit and may be attributable to the relatively small area of the heat exchange surfaces, or to inefficient transfer of heat to the circulating medium, or to a combination of these and other factors. Finally, many collectors must be mounted in an inclined position, and thus are inconvenient to use and consume considerable space.

One of the main objects of the present invention is to provide an improved collector for a solar heating system which is economical to construct and install, requires little maintenance and affords good efficiency. According to the invention, the new collector utilizes a gaseous heat exchange medium and is characterized in that it employs a group of heat exchange units which are relatively inexpensive and afford an unusually large heat exchange area. Each of these heat exchange units comprises a pair of open top metal foil pans having flat bottom walls, which abut one another, and outwardly flaring conical side walls, and carrying a black energy-absorbing coating. The collector comprises a glazed, insulated box, preferably of rectangular shape, having a chamber between the glazing and the back wall which is filled by a layer of the heat exchange units. These units are stacked in interfitting relationship in rows and columns, with the axes of adjacent interfitted units in each row and in each column extending in mutually perpendicular directions. The box is ported so that a working fluid, such as air, may be circulated through the array of pan units in the chamber.

The pans employed in the heat exchange units preferably are of the same type and size as those used heretofore as containers for frozen meat pies. However, the mating flat bottoms of the pans of each unit should be provided with registering openings so that the circulating gas will be able to flow through, and not just around, the layer of heat exchange units.

The preferred collector affords a heat transfer area on the order of 14 square feet per square foot of glazing and inherently provides for effective heat exchange contact between the circulating gas and the pan units. Therefore, the collector can be relatively small. Moreover, because of the shape and arrangement of the heat exchange units, the collector operates most efficiently when in the vertical position. Thus, the invention makes possible mounting on a side wall of a home or building, and thereby facilitates installation and conserves space.

Although the improved collector may be employed in various types of heating systems, some of which have heat storage capability, the presently preferred embodiment combines the collector with a fan unit which is adapted to be mounted in a standard window. This embodiment constitutes a portable, auxiliary room heater which can handle the heating requirements for a room of average size when the sun is shining, and thus permits a homeowner to derive immediate benefit from solar heating for a relatively modest expense.

BRIEF DESCRIPTION OF THE DRAWINGS

The preferred embodiment of the invention is described herein with reference to the accompanying drawings, in which.

DESCRIPTION OF ILLUSTRATED EMBODIMENT

Figure 1:
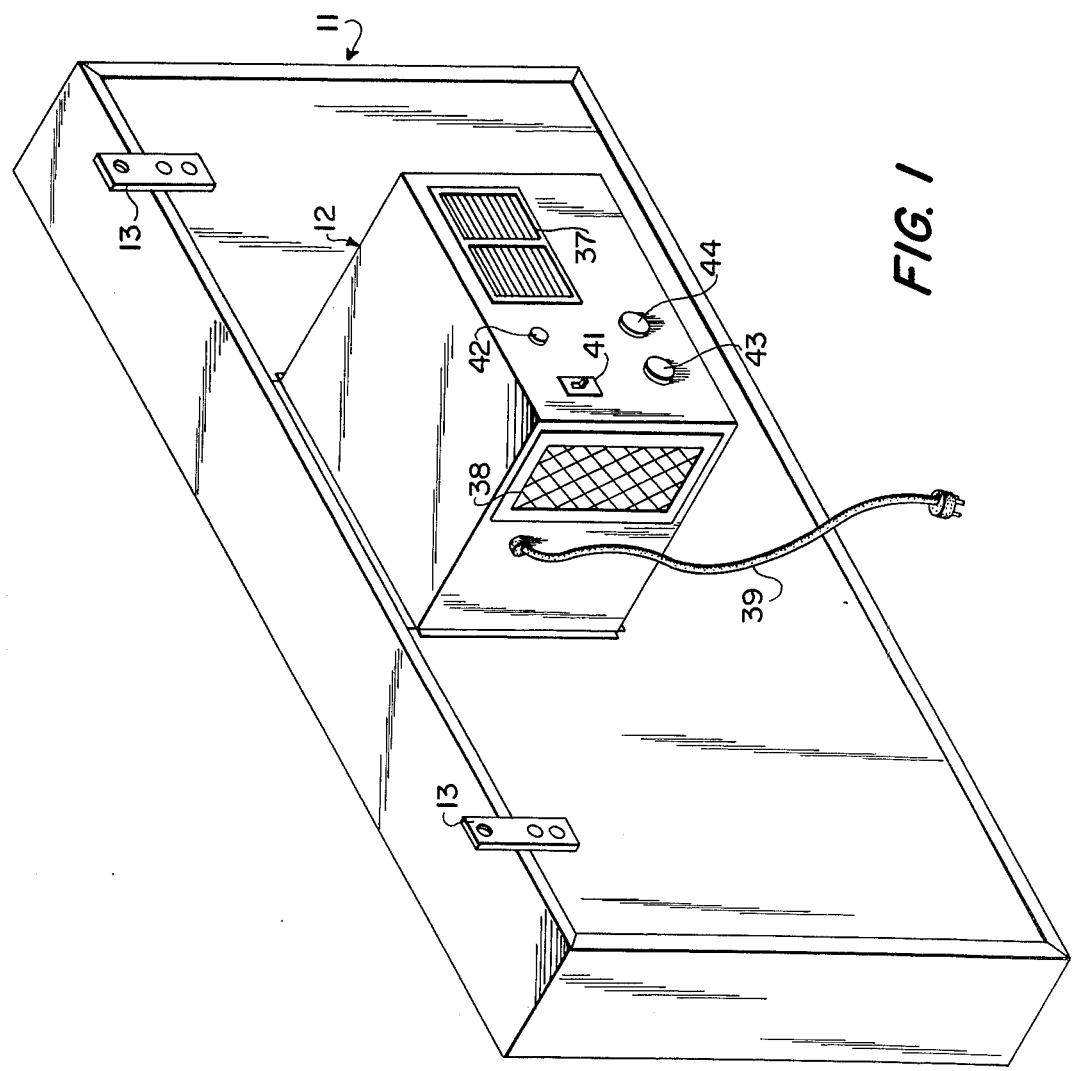
FIG. 1 is an isometric view of an auxiliary, window-type heater employing the improved collector.

As shown in FIG. 1, the improved collector 11 is combined with a fan and control assembly 12 to form a portable, window-type, auxiliary solar heater for the room of a home. The collector is of rectangular shape and is intended to be attached via hanger plates 13 to a south-facing wall of the house with the longer dimension extending in the horizontal direction. Assembly 12 is sized to fit through the opening of the lower sash of most standard double-hung windows and project into the room to be heated.

Collector 11 comprises an insulated box or casing which encloses a heat transfer chamber 14 to which solar radiation is admitted through a glazed front wall 15. The glazing consists of two layers 16 and 17 of an energy-transmitting material which are separated by an air space 18 and are seated in and sealed by rubber gaskets 19 which extend completely around their perimeters. One suitable material for layers 16 and 17 is Filon fiberglass marketed by Vistron Corporation of Hawthorne, California, but other glazing material used in the solar heating field may be employed. The remaining five walls of the collector box comprises inner and outer shells 21 and 22 fabricated from sheet aluminum, and a two-inch thick layer 23 of rigid urethane foam insulation. The urethane insulation may be foamed in situ or cut from a sheet of previously foamed material.

Figure 4:
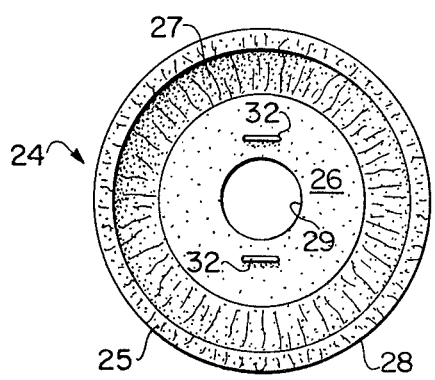
FIGS. 4 and 5 are top and side views, respectively, of one of the heat exchange units.
Figure 5:
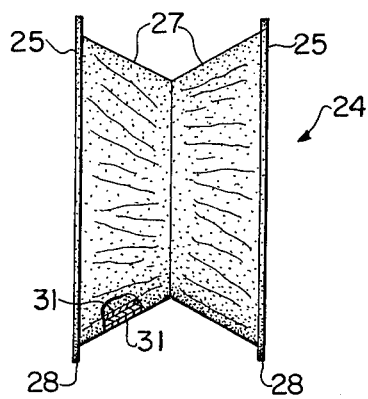

The heat transfer chamber 14 of the collector is filled with a group of discrete heat transfer units 24 comprising pairs of identical metal foil pans 25. Referring to FIGS. 4 and 5, each pan 25 includes a flat circular bottom wall 26, and an outwardly flaring conical side wall 27 which has a small external flange 28 at its outer edge. The pans 25 of each unit 24 are arranged back-to-back with their bottom walls 26 in abutment, and these walls contain registering openings 29 through which the gaseous heat exchange medium circulates. While the illustrated pans use a relatively large, centrally located opening 29, a series of smaller openings distributed over the area of wall 26 could be used. The entire surface of each pan 25 is covered by a black energy-absorbing coating 31, indicated in a much exaggerated way in FIG. 5. A suitable coating material is a black epoxy paint, such as the Alumox No. 3600 high temperature, food grade coating used on baking pans. It is considered most convenient to apply the coating to the metal foil stock used to make the pans, rather than to the completed pans. The pan-forming operation inherently creates gathers or wrinkles (sometimes termed "wrinkle flo") in conical side wall 27 and flange 28. This is advantageous because it increases the heat exchange area of the unit 24. The two pans 25 of each unit 24 preferably are attached together, as by staples 32, because this facilitates installation of the units in collector 11.

Except for the black coating 31 and the opening 29, the preferred pan 25 is the same size and shape as pans used in the past as containers for frozen metal pies. These pans are made of aluminum foil having a thickness of 4 mils (0.004 inches), and have a maximum diameter of 5", and a depth of $1\frac{1}{4}$". The width of flange 28 is about 3/16", and bottom wall 26 has a diameter of about $2\frac{3}{4}$". A suitable flow opening 29 for these pans has a diameter of 1".

Figure 2:
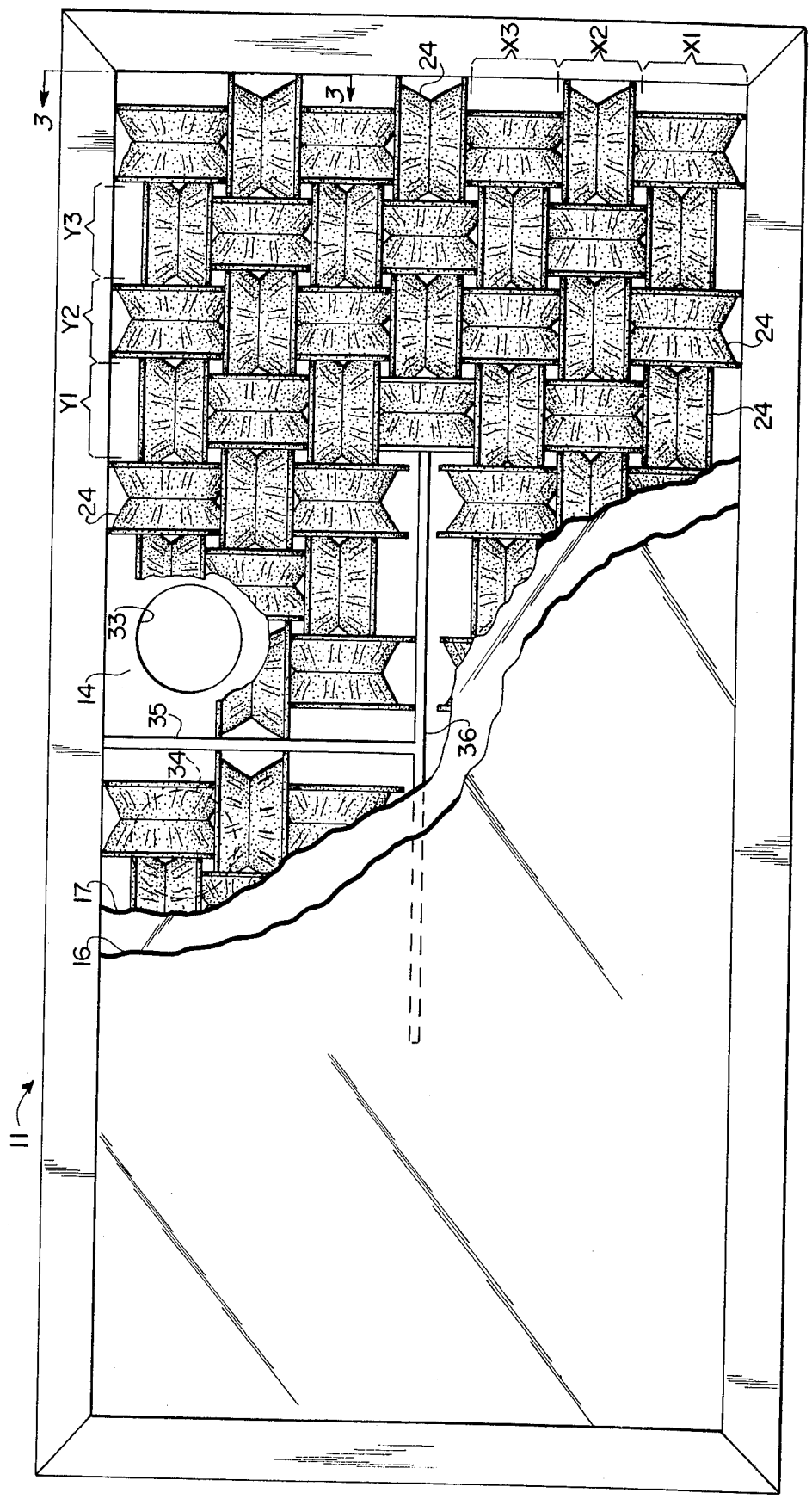
FIG. 2 is a front view of the collector, on enlarged scale, with a portion of the glazing broken away to show the stacked arrangement of the heat transfer units.
Figure 3:
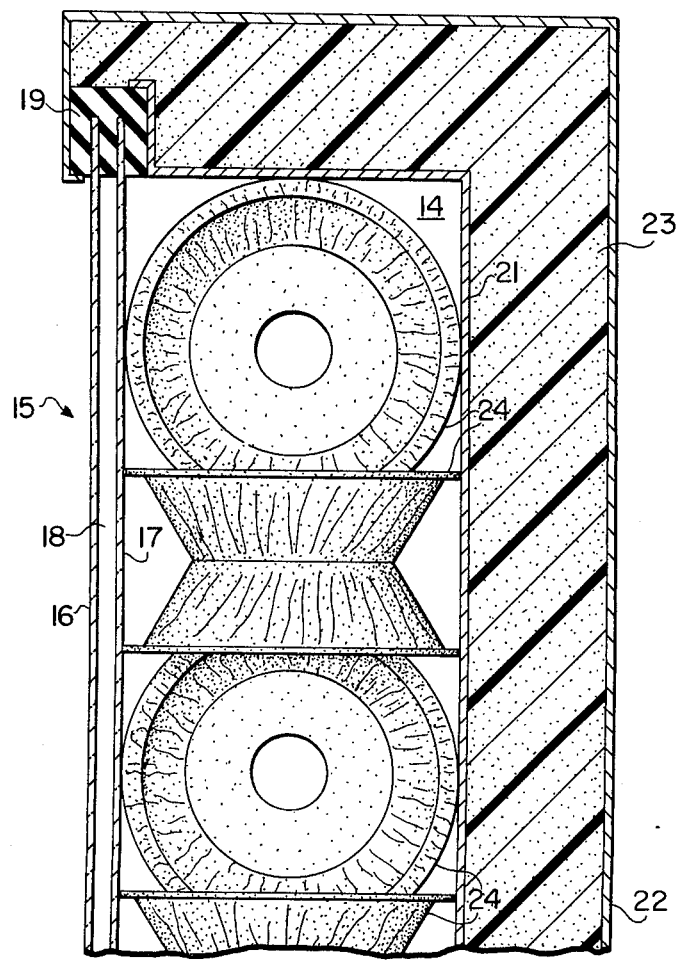
FIG. 3 is a sectional view, on enlarged scale taken on line 3—3 of FIG. 2.

Referring to FIG. 2, the heat transfer units 24 in chamber 14 are stacked in interfitting relationship in rows (e.g. X1, X2 and X3) and columns (e.g. Y1, Y2, and Y3), with the axes of adjacent interfitted units in each row and in each column extending in mutually perpendicular directions. Since the front and rear walls of the collector are flat, the axes of units 24 lie in a common plane which is parallel with those walls. The width of chamber 14 is just slightly greater than the diameter of pans 25, and the length and width of the chamber are just sufficient to accommodate the horizontal and vertical stacks of heat transfer units. In other words, chamber 14 is filled as far as practicable by the heat exchange units 24.

It is known in the art that the energy-absorbing surfaces of a collector must be disposed at an angle of 90° to the sun's rays for maximum collecting efficiency. Therefore, a conventional collector employing a flat plate absorber affords maximum efficiency in only one position and must be reoriented constantly to maintain this performance throughout the day and throughout the heating season. In contrast, the improved collector 11, because of the peculiar shape and arrangement of its heat transfer units 24, always presents a large area of energy-absorbing surface which is normal to the sun's rays, regardless of the hour of the day or the day of the year. As a result, reorientation of the collector is not required. Moreover, collector 11 exhibits maximum efficiency in the vertical position, so mounting of this unit on the side wall of a building not only is possible, but is recommended. The advantages of this type of installation, particularly to the homeowner, are obvious.

Although the exact dimensions of the pans 25 are not critical, the size specified above affords a 14:1 ratio of heat transfer area to glazing area, and appears to be the optimum design, at least for collectors sized for use in window-mounted heaters. While pans of larger diameter have greater surface area and might appear to be superior, this is not the case, because use of such pans necessitates an increase in the depth of chamber 14. Such a change is undesirable, for it increases the expenditure for material, the volume to be heated and the heat losses through the walls, and, in general, results in a less efficient collector. Experience shows that best efficiency is achieved by careful correlation of pan surface area and chamber depth, and that, within reason, the depth should be kept to a minimum.

Heat transfer chamber 14 is provided with air inlet and outlet ports 33 and 34, respectively, located in the central upper region of its rear wall, and with a flow-directing baffle comprising a vertical plate 35 and a crossing horizontal plate 36. These plates 35 and 36 extend between the front and rear walls of chamber 14 and compel the air entering at port 33 to course through substantially the entire array of heat transfer units 24 before exiting at port 34. With the described arrangement, there is little opportunity for the air to flow along the inside surface of glazing layer 17, so practically all of the circulating stream must flow through and/or around the units 24 along various irregular paths. As a result, a high proportion of the heat absorbed by units 24 is transferred to the air stream.

The design of assembly 12 is not an aspect of the present invention, so only a general discussion of its features will be presented. First, and most important, the assembly contains a centrifugal fan which circulates room air through the chamber 14 of collector 11. The fan inlet is connected by a duct with collector port 34 and discharges the withdrawn, heated air into the room through a louvered outlet grille 37. Another duct, provided with an expanded metal inlet grille 38, delivers cool room air to collector port 33. The fan motor is equipped with an electrical circuit including line cord 39, on-off switch 41, and conventional automatic controls of the dual thermostat type. These controls respond to the temperatures in the inlet and outlet ducts and turn on the fan only when the temperature of the room air is below a desired level (e.g. 68° F.) and the temperature of the air leaving port 34 is high enough to insure stable operation (i.e., to preclude on-off cycling of the fan). In a representative case, a suitable threshold outlet temperature is 80° F. Assembly 12 may also include a ready lamp 42, which lights when switch 41 is in ON position, and indicators 43 and 44 for displaying the temperatures sensed by the two thermostats.

The preferred window mounted heater for home use employs a collector 11 equipped with the specific heat transfer units 24 mentioned above and having an overall length and width of 7 feet and 3 feet, respectively, and an effective glazing area of 19.83 square feet. A suitable fan for this heater has a discharge flow rate of about 140 cubic feet per minute. This particular window mounted unit has been tested under winter conditions at 40° N. Latitude and proved to be capable of handling the heating needs of a 16'×16' exterior room having average insulation (i.e., a room having a heat loss rate of 2300 BTU per hour). The following table contains performance data for the heater on a typical clear, sunny day in January when the average outside temperature was 20° F.:

| TIME | INSOLATION BTU/HOUR | COLLECTOR OUTPUT °F. | BTU/HOUR |
|---|---|---|---|
| 8:00a.m. | 1665.7 | 78.3 | 1407.9 |
| 9:00a.m. | 3390.9 | 89.0 | 2875.4 |
| 10:00a.m. | 4422.1 | 95.4 | 3757.8 |
| 11:00a.m. | 5017.0 | 99.1 | 4263.5 |
| NOON | 5215.3 | 100.4 | 4441.9 |
| 1:00p.m. | 5017.0 | 99.1 | 4263.5 |
| 2:00p.m. | 4422.1 | 95.4 | 3757.8 |
| 3:00p.m. | 3390.9 | 89.0 | 2875.4 |

| TIME | INSOLATION BTU/HOUR | COLLECTOR OUTPUT °F. | BTU/HOUR |
| --- | --- | --- | --- |
| 4:00p.m. | 1665.7 | 78.3 | 1407.9 |

The insolation figures given here represent the solar radiation available in chamber 14. They are based on data published by ASHRE which has been adjusted downward to take account of the transmission efficiency (92% in the case of the material specified earlier) of glazing 15. The heat output figures were calculated using an air density of 0.068 pounds per cubic foot (the density of air at the room temperature of 68° F. and a pressure of one atmosphere) and a specific heat value of 0.24 BTU per pound $-$°F. Stable operation of this particular apparatus was achieved at collector outlet temperatures above 80° F.; therefore, the heater was effective throughout the period beginning just shortly after 8:00 a.m. and ending just before 4:00 p.m. Moreover, the data shows that the unit converts about 85% of the insolation to useful heat, and that the output during almost the whole effective period is more than sufficient to meet the needs of the average 16′×16′ room.

I claim:

1. An energy transfer unit for a solar heater comprising
   a. a pair of similar, open top metal foil pans, each pan having a flat bottom wall and an outwardly flaring, conical side wall, and the walls of each pan being covered by a black, energy-absorbing coating; and
   b. means connecting the pans to each other with their bottom walls in abutment.

2. An energy transfer unit as defined in claim 1 in which the bottom wall of each pan contains at least one opening; and the openings in the bottom walls register with one another.

3. An energy transfer unit as defined in claim 2 in which the conical side wall of each pan has an outturned flange at its free edge; and the side walls and flanges are wrinkled.

4. An energy transfer unit as defined in claim 3 in which said through opening of each pan is located in the central region of the bottom wall.

5. An energy collector for solar heating apparatus comprising
   a. an insulated box having walls which enclose a heat transfer chamber, and one of which is glazed to permit entry of solar radiation;
   b. a group of energy transfer units in said chamber,
   c. each unit comprising a pair of similar open top metal foil pans having flat bottom walls which are in abutment, outwardly flaring conical side walls, and a black energy-absorbing coating covering said walls; and
   d. fluid circulation means, including inlet and outlet ports which communicate with the chamber, for causing a fluid which is to be heated to course through said group of energy transfer units.

6. An energy collector as defined in claim 5 in which said energy transfer units are stacked in interfitting relationship in rows and columns, with the axes of adjacent interfitted units in each row and in each column extending in mutually perpendicular directions.

7. An energy collector as defined in claim 6 in which
   a. the box has a back wall opposite the glazed wall which is spaced from the latter a distance corresponding to the maximum diameter of the energy transfer units; and
   b. the energy transfer units are stacked in a layer one unit wide which is disposed between said glazed and back walls.

8. An energy collector as defined in claim 7 in which
   a. the bottom wall of each pan contains a through opening, and said openings of the pans of each unit are in registration with each other;
   b. the conical wall of each pan has an outturned flange at its free edge; and
   c. the conical wall and flanges of the pans are wrinkled.

9. An energy collector as defined in claim 8 in which the fluid circulation means includes interior wall means positioned in the box to compel fluid introduced to said chamber through the inlet port to course through substantially the whole stack of energy transfer units before exiting from the chamber through the outlet port.

* * * * *